United States Patent [19]
Ohba

[11] Patent Number: 5,091,622
[45] Date of Patent: Feb. 25, 1992

[54] COMPOUND MACHINING METHOD AND APPARATUS

[75] Inventor: Nobuaki Ohba, Aichi, Japan

[73] Assignee: Mitsubishi Denki K.K., Tokyo, Japan

[21] Appl. No.: 493,048

[22] Filed: Mar. 13, 1990

[30] Foreign Application Priority Data

May 10, 1989 [JP] Japan ............................ 1-116440
Jun. 1, 1989 [JP] Japan ............................ 1-139740

[51] Int. Cl.$^5$ ............................................. B23H 5/04
[52] U.S. Cl. ........................... 219/69.15; 219/69.17
[58] Field of Search ............ 219/69.15, 69.17, 68, 219/69.12, 69.11

[56] References Cited

U.S. PATENT DOCUMENTS

| | | | |
|---|---|---|---|
| 4,596,066 | 6/1986 | Inoue | 219/69.15 |
| 4,725,704 | 2/1988 | Vuichard | 219/69.12 |
| 4,751,361 | 6/1988 | Inoue et al. | 219/69.12 |
| 4,754,115 | 6/1988 | Rhoades | 219/69.15 |
| 4,764,653 | 8/1988 | Bühler | 219/69.15 |
| 4,859,824 | 8/1989 | Ukaji et al. | 219/69.15 |
| 4,891,485 | 1/1990 | Briffod | 219/69.17 |
| 5,006,685 | 4/1991 | Hatano et al. | 219/69.15 |

FOREIGN PATENT DOCUMENTS

| | | | |
|---|---|---|---|
| 54-24379 | 2/1979 | Japan. | |
| 64-51226 | 2/1989 | Japan | 219/68 |
| 8903745 | 5/1989 | PCT Int'l Appl. | 219/68 |

*Primary Examiner*—Geoffrey S. Evans
*Attorney, Agent, or Firm*—Sughrue, Mion, Zinn, Macpeak & Seas

[57] ABSTRACT

A compound machining apparatus according to the present invention comprises an electrode mechanical machining device for machining an electrode material fixedly secured in such a manner that the electrode material is immersed in a machining solution with a cutting tool connected to a spindle into an electrode having a predetermined configuration; parts exchanging device for exchanging, after the formation of the electrode, the cutting tool connected to the spindle for a workpiece to be machined; and workpiece machining device for machining, after the cutting tool has been exchanged for the workpiece, the workpiece with the electrode in the machining solution by electric discharge.

8 Claims, 17 Drawing Sheets

COMPOUND MACHINING METHOD AND APPARATUS

FIELD OF THE INVENTION

This invention relates to compound machining apparatuses, and more particularly to a compound machining apparatus with which an electrically machining electrode is formed by mechanical machining, and a workpiece is electrically machined with the electrode thus formed.

DESCRIPTION OF THE RELATED ART

For convenience in description, a cutting operation will be described for the mechanical machining operation, and an electric discharge machining operation for the electrical machining operation.

FIG. 13 is an explanatory diagram showing the entire arrangement of a compound machining apparatus which has been proposed by applicant as a related art.

In FIG. 13, reference numeral 1 designates an electric discharge machining electrode; 2, a workpiece to be machined; 3, a machining vessel; and 4, a machining solution such as electrically insulating oil in the machining vessel. In general, the machining operation of the compound machining apparatus is carried out in the machining solution 4 in the machining vessel 3. Further in FIG. 13, reference numeral 5 designates a pulse current generating unit for supplying pulse current to the electrode 1 and the workpiece 2; 8a, ball screw for moving the spindle of the compound machining apparatus vertically (in the Z-axis direction); 8c, a ball screw for moving the workpiece 2 right and left (in the X-axis direction; 9a, a servo motor for driving the Z- axis ball screw 8a; 9b, a servo motor for driving a ball screw (not shown) which moves the workpiece 2 back and forth (in the Y-axis direction); 9c, a servo motor for driving the X-axis ball screw 8c; 10, an NC (numerical control) unit for controlling the servo motors 9a, 9b and 9c according to a given machining program; 11, a head positioned high in the apparatus; a column which is a frame supporting the head 11; 13, the bed of the apparatus; 14b, a movable table for moving the workpiece 1 together with the machining vessel 3 back and forth (in the Y-axis direction); 14c, a movable table for moving the workpiece 3 together with the machining vessel 3 right and left (in the X-axis direction); 15, the spindle head which is the core of the spindle of the compound machining apparatus; 16, an electrode exchanging unit for exchanging the electrode 1 secured to the spindle for a cutting tool for instance; 17, an arm for holding the electrode 1 in an electrode exchanging operation; 18, a magazine rack in which the electrode 1 and other tools are accommodated; and 19, a cutting tool to be used for a predetermined cutting operation.

In the compound machining apparatus thus constructed, the electric discharge machining electrode 1 is shaped with the cutting tool 19 as required before it is used to discharge-machine the workpiece 2. This electric discharge machining operation will be described.

The electrode 1 and the workpiece 2 are immersed in the machining solution 4 in the machining vessel 3 in such a manner that they are confronted with each other. The output pulse current of the pulse current generating unit 5 is applied to the electrode 1 and the workpiece 2 thus immersed, as a result of which electric discharge occurs intermittently in the gap between the electrode 1 and the workpiece 2, thus machining the latter 2. In this operation, the electrode 1 is moved vertically in response to instructions provided by the numerical control unit 10, being coupled through the ball screw 8a to the Z-axis servo motor 9a. The Y-axis movable table 14b is connected through the ball screw (not shown) to the Y-axis servo motor 9b. The X-axis movable table 14c is connected through the ball screw 8c to the X-axis servo motor 9c. These movable tables 14b and 14c are movable along the Y-axis and the X-axis, respectively, in response to instructions from the numerical control unit 10. Hence, the electrode 1 and the workpiece 2 can be moved relative to each other in a horizontal direction, for positioning them in a horizontal direction or machining the workpiece in a horizontal direction. Thus, by suitably controlling the operations of the servo motors 9a, 9b and 9c, the workpiece 1 can be discharge-machined as desired; more specifically, a desired portion of the workpiece can be machined into a desired configuration by electric discharge.

Now, a cutting operation and an electric-discharge machining operation with the compound machining apparatus will be described.

FIG. 14a is an explanatory diagram showing the states of essential components of the compound machining apparatus shown in FIG. 13 which are revealed before the electrode is cut, and FIG. 14b is an explanatory diagram showing the states of the essential components which are revealed after the electrode is cut. FIG. 15a is an explanatory diagram showing the states of essential components of the compound machining apparatus shown in FIG. 13 which are revealed when the workpiece is cut, and FIG. 15b is an explanatory diagram showing the states of the essential components which are revealed when the workpiece is machined by electric discharge. In these figures, components designated by reference numerals 1 through 4, 15 and 19 are the same as or equivalent to those in FIG. 13.

Further in FIGS. 14 and 15, reference numeral 20 designates an electrode fixing stand which is a jig for fixing the electrode 1 which is immersed in the machining solution 4 in the machining vessel 3; 21, workpiece fixing stands which are jigs for fixing the workpiece 2 which is immersed in the machining solution 4 in the machining vessel 3; vessel 3; 22, a primary recess which is formed with the cutting tool 19; and 23, a secondary cut which is formed with the electrode 1 by electric discharge.

First, an operation of cutting the electric discharge machining electrode 1 will be described with reference to FIG. 14.

A predetermined cutting tool 19 is connected to the spindle head 15 which forms a part of the spindle of a compound machining apparatus, and the electrode to be cut is fixedly secured to the electrode fixing stand 10 in such a manner that it is immersed in the machining solution 4 in the machining vessel 3 (as shown in FIG. 14a). Under this condition, the servo motors 9a, 9b and 9c are suitably controlled by the numerical control unit 10 to shape the electrode as required (cf. FIG. 14b).

An operation of machining the workpiece 1 by electric discharge will be described with reference to FIG. 15.

Another predetermined cutting tool 19 is connected to the spindle head 15, and the workpiece is fixed with the workpiece fixing stands 21 in such a manner that it is immersed in the machining solution 4 in the machining vessel 3. The workpiece 2 is roughly machined with the cutting tool 19 until the primary cut 22 is obtained which is similar to the final machined configuration (as shown in FIG. 15a). Thereafter, the cutting tool 19 is replaced by the electric discharge machining electrode 1 which has been formed according to the method described with reference to FIG. 14b. The secondary cut 23 is formed by electric discharge with the electrode 1 set close to the primary cut 22 of the workpiece 2, so that the workpiece is finally machined (as shown in FIG. 15b).

In the case of the above-described compound machining apparatus, first an electrode 1 having a predetermined configuration is formed with the cutting tool 19, and the electrode 1 thus formed is used to machine the workpiece by electric discharge. The operation of forming the electrode 1 and the operation of machining the workpiece with the electrode are carried out individually. That is, the electrode material is secured in the machining solution in the machining vessel to form the electrode 1. Thereafter, the electrode 1 is removed, and connected to the spindle, and the workpiece 2 is fixedly secured in the machining solution 4 in the machining vessel 3, and machined with the electrode 1 thus connected.

As was described above, in the compound machining apparatus, since the electric discharge machining operation is carried out after the electrode forming operation, it is necessary to make a variety of arrangements. In general, the arrangements are not automated: that is, they must be achieved manually by the operator. Accordingly, it is considerably troublesome to shift one machining operation to another, and accordingly it takes a relatively long time to form the electrode and to machine the workpiece with it.

SUMMARY OF THE INVENTION

In view of the foregoing, an object of this invention is to provide a compound machining method in which an operation of forming an electric discharge machining electrode by cutting, and an operation of machining a workpiece with the electrode by electric discharge are automatically and continuously carried out, and a compound machining apparatus for practicing the method.

A compound machining apparatus according to a first invention comprises: electrode forming means for cutting an electrode material fixedly secured in such a manner that the electrode material is immersed in a machining solution 4 with a cutting tool 19 connected to a spindle into an electrode 1 having a predetermined configuration; parts exchanging means for exchanging, after the formation of the electrode, the cutting tool 19 connected to the spindle for a workpiece 2 to be machined; and workpiece machining means for machining, after the cutting tool has been exchanged for the workpiece, the workpiece 2 with the electrode 1 in the machining solution 4 by electric discharge. In a compound machining apparatus according to a second invention, an electrode fixing angle changing unit 30 capable of changing an electrode fixing angle freely is employed for fixedly securing the electrode material in such a manner that it is immersed in the machining solution 4.

In a compound machining apparatus according to a third invention, the electrode forming means of the second invention is employed as it is, and the parts exchanging means of the first invention is so modified that, after the formation of the electrode, the electrode fixing angle is changed by 180° to exchange the cutting tool 19 connected to the spindle for the electrode 1, and the workpiece machining means of the first invention is also so modified that the workpiece is machined in the machining solution 4 with the electrode 1 thus connected to the spindle.

A compound machining apparatus according to a fourth invention comprises: electrode forming means for mechanically machining an electrically machining electrode material into an electrode having a predetermined configuration; electrode engaging and disengaging means for engaging the electrode thus formed with an electrode connecting member and disengaging the electrode therefrom; and workpiece machining means for electrically machining a workpiece with the electrode connected to the electrode connecting member by the electrode engaging and disengaging means.

A compound machining apparatus according to a fifth invention comprises: the electrode machining means, the part exchanging means, and the workpiece machining means according to the first invention as they are; and a first electrode moving means for moving, separately according to machining steps, the electrode, to a plurality of electrode holders different in electrode engagement direction and connecting the electrode thereto; second electrode moving means for moving a dummy electrode to the electrode holder to which the electrode is not connected and connecting the dummy electrode thereto; and third electrode moving means for moving the electrode and the dummy electrode between the electrode holders and the spindle and connecting the electrodes thereto;

A compound machining method according to a sixth invention comprises: a first step of cutting an electrode material fixedly secured in such a manner that the electrode material is immersed in a machining solution 4 with a cutting tool 19 connected to a spindle into an electrode 1 having a predetermined configuration; a second step of for exchanging, after the first step, the cutting tool 19 connected to the spindle for a workpiece 2 to be machined; and a third step of machining, after the second step, the workpiece 2 with the electrode 1 in the machining solution 4 by electric discharge.

A compound machining method according to a seventh invention comprises; a step of cutting an electrode material fixedly secured in such a manner that the electrode material is immersed in a machining solution 4 with a cutting tool 19 connected to a spindle into an electrode 1 having a predetermined configuration; a first electrode moving step of moving, separately according to machining steps, the electrode 1 to a plurality of electrode holders 51 and 52 different in electrode engagement direction and connecting the electrode 1 thereto; a second electrode moving step of moving a dummy electrode 61 to the electrode holder 51 or 51 to which the electrode 1 is not connected, and connecting the dummy electrode thereto; a third electrode moving step of moving the electrode 1 and the dummy electrode 61 between the electrode holders 51 and 52 and the spindle, and connecting the electrodes thereto; a step of exchanging, after the formation of the electrode, the cutting tool 19 connected to the spindle for a workpiece 2; and a step of machining the workpiece 2 in the machining solution 4 by electric discharge with the electrode 1 connected to the spindle.

In the compound machining apparatus according to the first invention, the electrode material fixedly immersed in the machining solution is cut with the cutting tool 19 connected to the spindle into an electrode having a predetermined configuration, and instead of the cutting tool 19, a workpiece to be machined is connected to the spindle, so that it is machined with the electrode in the machining solution by electric discharge. Hence, the step of forming the electric discharge machining electrode 1, and the step of machining the workpiece 2 by electric discharge are automatically successively carried out; that is, the electrode 1 is formed by cutting the electrode material held immersed in the machining solution, and in succession to the formation of the electrode the workpiece is discharge-machined with the electrode thus formed.

In the compound machining apparatus according to the second invention, in the electrode forming step of the first invention, an electrode fixing angle changing unit 30 capable of changing an electrode fixing angle freely is employed to fixedly immerse the electrode material in the machining solution 4. Therefore, similarly as in the first invention, the step of forming the electric discharge machining electrode 1, and the step of machining the workpiece by electric discharge are automatically successively carried out, and the electrode forming operation and the workpiece machining operation can be performed with the electrode fixing angle changed to a desired value.

In the compound machining apparatus according to the third invention, similarly as in the compound machining apparatus of the second invention, the electrode material is fixedly immersed in the machining solution 4 with an electrode fixing angle changing unit 30 capable of changing an electrode fixing angle freely, and after the formation of electrode 1, with the electrode fixing angle changed the cutting tool 19 connected to the spindle is exchanged for the electrode, so that the electrode is used to machine the workpiece 1 in the machining solution. Hence, similarly as in the above-described first and second inventions, the step of forming the electric discharge machining electrode 1, and the step of machining the workpiece 2 with the electrode 1 by electric discharge can be automatically successively carried out, and the electrode forming operation and the workpiece machining operation can be performed with the workpiece held immersed in the machining solution 4 in the machining vessel 3.

In the compound machining apparatus according to the fourth invention, the electrically machining electrode material is mechanically machined into an electrode having a predetermined configuration, the electrode thus formed is connected to the electrode connecting member with the electrode engaging and disengaging means, and the workpiece is electrically machined with the electrode thus connected.

In the compound machining apparatus according to the fifth invention, the electrode forming means, parts exchanging means, and workpiece machining means are provided which are the same as those in the first invention, so that, similarly, the step of forming the electric discharge machining electrode 1, and the step of machining the workpiece 2 with the electrode 1 by electric discharge are automatically successively carried out. In addition, in the apparatus, the electrode is connected to the electrode holders 51 and 52 separately according to the machining steps so that the electrode fixing angle is changed, while the dummy electrode 61 is connected to the electrode holders 51 or 52 to which the electrode 1 is not connected: that is, the electrode connecting parts of the electrode holders 51 and 52 are kept covered with the electrode 1 and the dummy electrode 61 at all times. Accordingly, the difficulty is eliminated that the waste material such as chips and slag formed during the electrode forming operation and the workpiece machining operation using the electrode sticks to the electrode connecting parts of the electrode holders 51 and 52.

In the compound machining method according to the sixth invention, the electrode material fixedly immersed in the machining solution 4 is cut with the cutting tool 19 connected to the spindle into an electric discharge machining electrode 1 having a predetermined configuration, and thereafter the cutting tool 19 connected to the spindle is replaced by a workpiece 2 to be machined, so that the workpiece is machined with the electrode in the machining solution by electric discharge. Hence, the step of forming the electrode 1, and the step of machining the workpiece 2 with the electrode 1 by electric discharge are automatically successively carried out; that is, with the electrode 1 kept immersed in the machining solution 4 the electrode forming operation and the workpiece machining operation are successively performed.

In the compound machining method according to the seventh invention, the electrode material fixedly secured in such a manner that the electrode material is immersed in the machining solution 4 is cut with the cutting tool 19 connected to the spindle into an electrode 1 having a predetermined configuration, separately according to machining steps, the electrode 1 is moved to a plurality of electrode holders 51 and 52 different in electrode fixing angle and connected thereto, the dummy electrode 61 is moved to the electrode holder 51 or 52 to which the electrode 1 is not connected, and connected thereto, and the electrode 1 and the dummy electrode 61 are between the electrode holders 51 and 52 and the spindle, and connected thereto. In addition, in the method, after the formation of the electrode, the cutting tool 19 connected to the spindle is replaced by the workpiece 2, so that the latter 2 is machined in the machining solution 4 with the electrode 1 by electric discharge.

Therefore, the electrode connecting parts of the electrode holders 51 and 52 are kept covered with the electrode 1 and the dummy electrode 61 at all times. Accordingly, the difficulty is eliminated that the waste material such as chips and slag formed during the electrode forming operation and the workpiece machining operation using the electrode sticks to the electrode connecting parts of the electrode holders 51 and 52.

BRIEF DESCRIPTION OF THE DRAWINGS

FIG. 4b is an explanatory diagram shown the states of the essential components which are revealed after the electrode forming operation is accomplished.

Figure 6A:
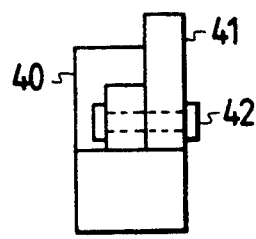
Figure 6B:
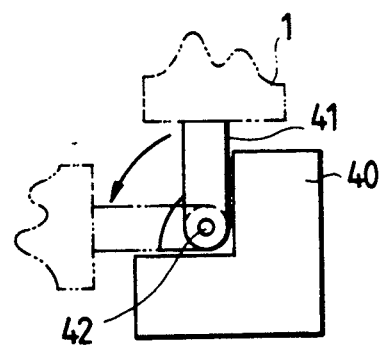

FIGS. 6a and 6b are a front view and a side view, respectively, showing one example of the electrode fixing angle changing unit which can be employed in the compound machining apparatus shown according to the second invention.

Figure 7:
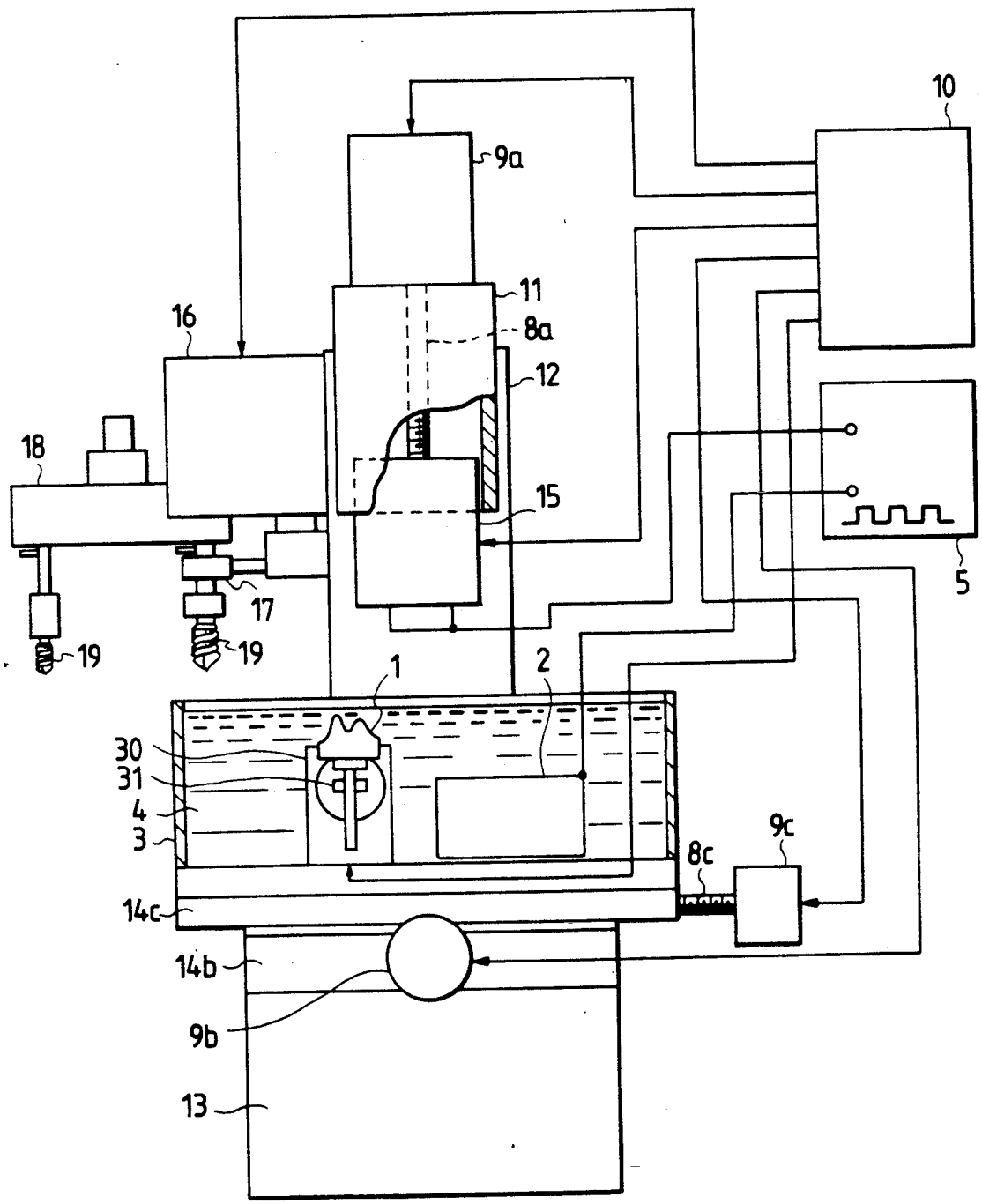

FIG. 7 is an explanatory diagram showing the entire arrangement of a compound machining apparatus, an embodiment of a third invention.

Figure 8A:
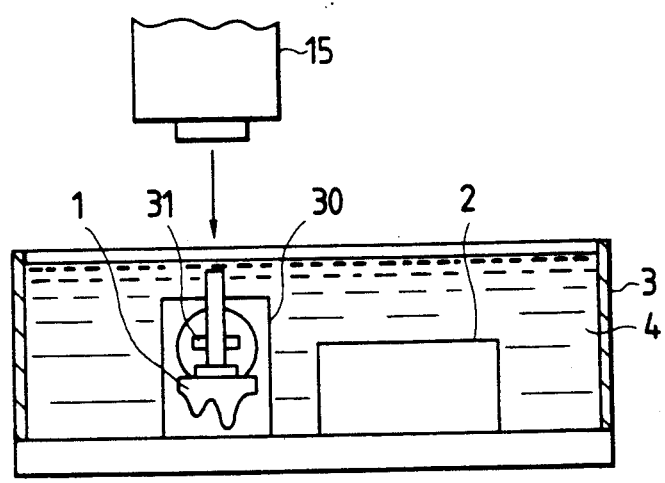
Figure 8B:
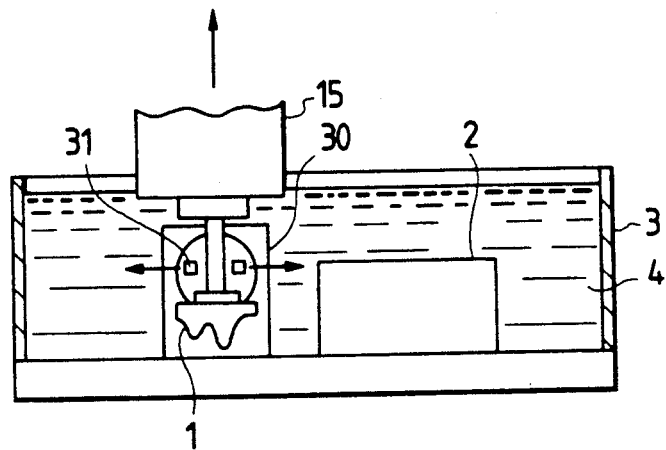
Figure 8C:
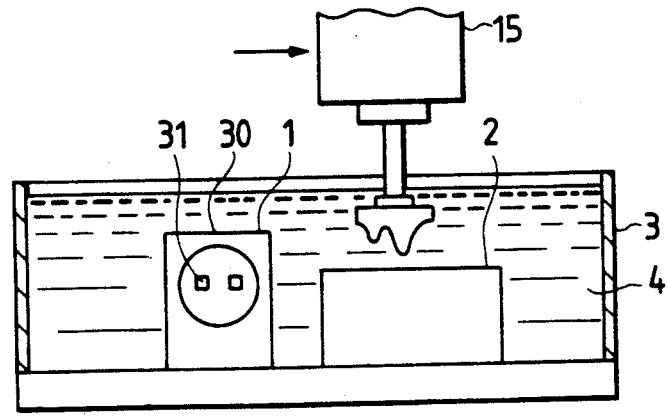

FIG. 8a to 8c are explanatory diagrams for a description of the machining operations of the compound machining apparatus shown in FIG. 7.

Figure 9:
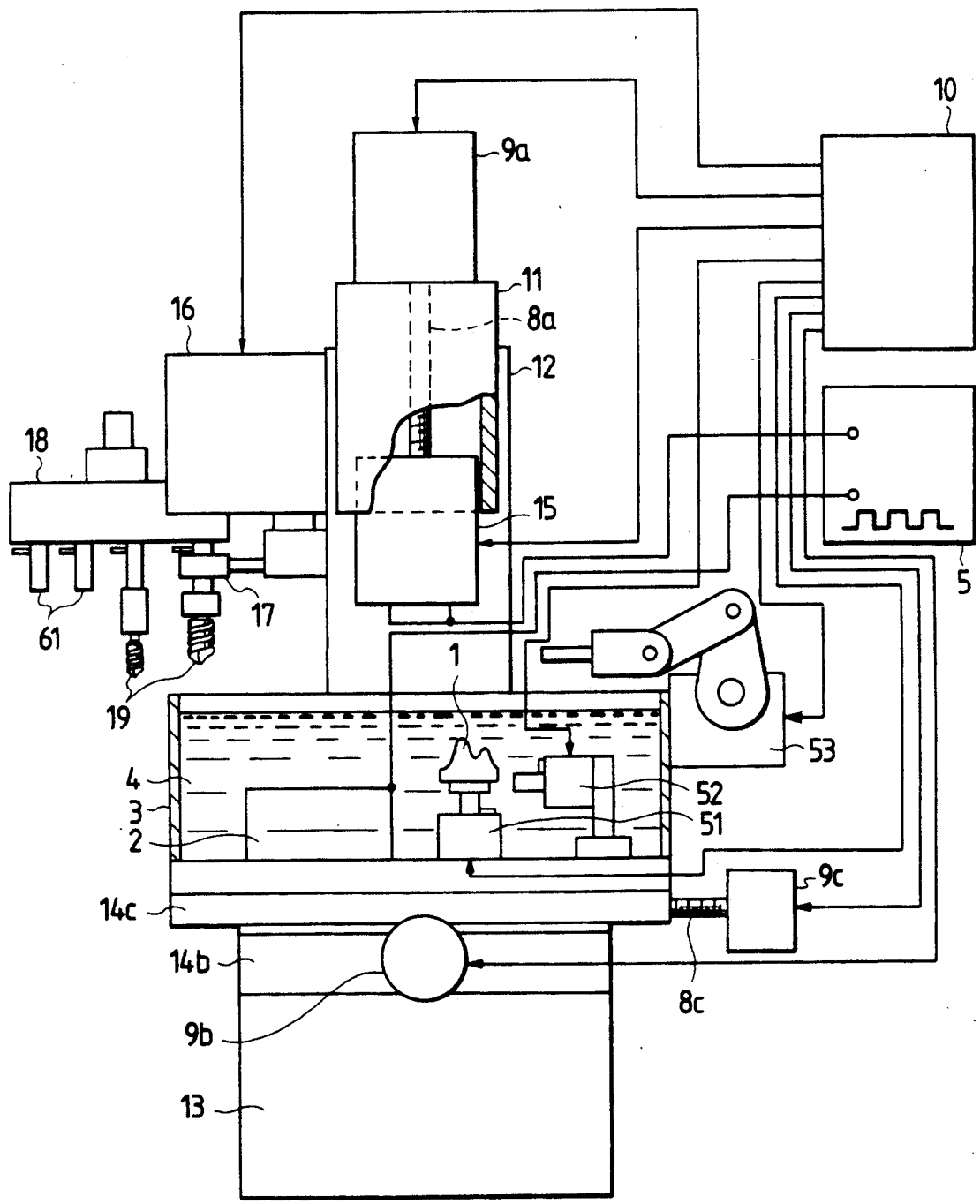

FIG. 9 is an explanatory diagram showing the entire arrangement of a compound machining apparatus, an embodiment of a fourth invention.

FIGS. 10a to 10c, FIGS. 11a to 11c and FIGS. 12a to 12c are explanatory diagrams for a description of the machining operations of the compound machining apparatus shown in FIG. 9.

Figure 13:
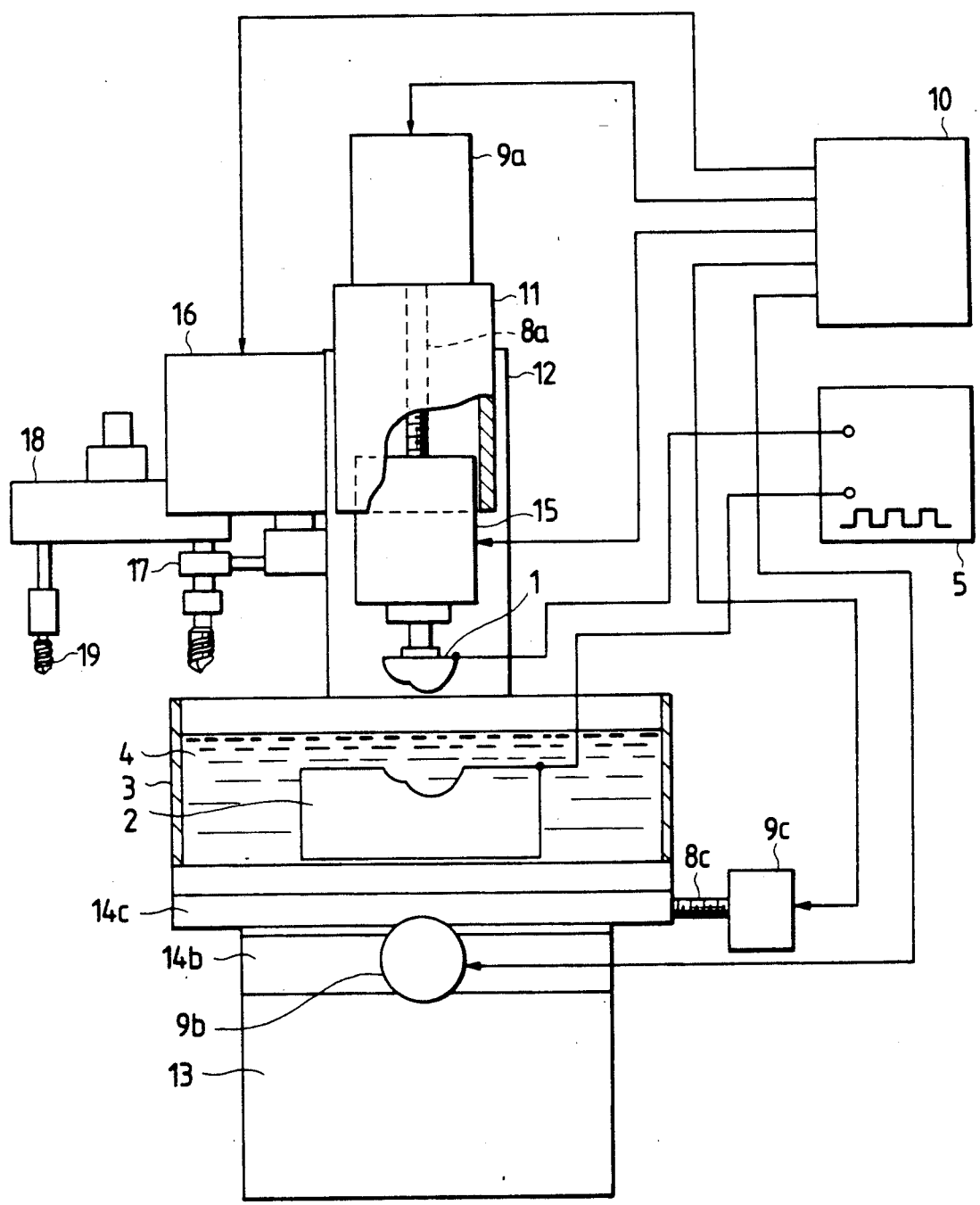

FIG. 13 is an explanatory diagram showing the entire arrangement of a compound machining apparatus which proposed by applicants as related art.

Figure 14:
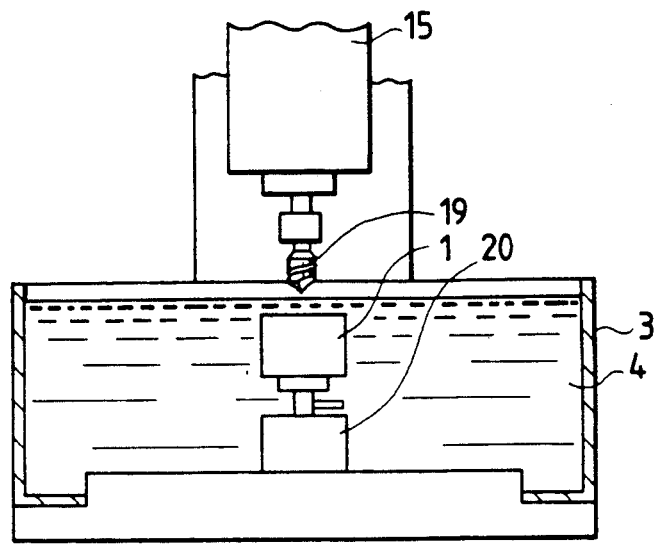
Figure 14B:
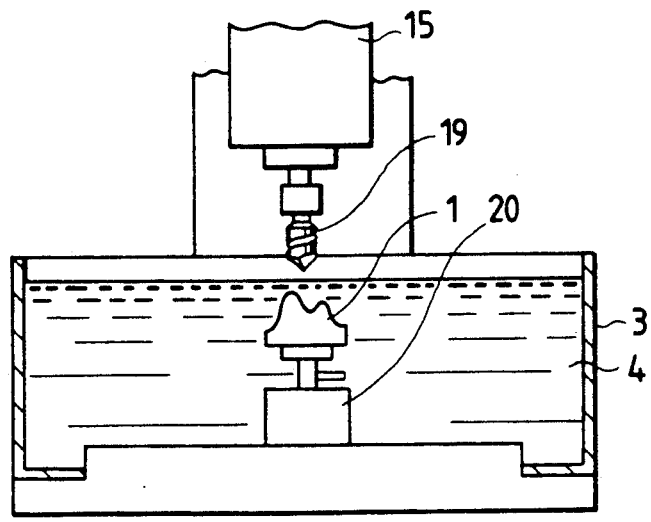

FIG. 14a is an explanatory diagram showing the states of essential components of the apparatus which are revealed before an electric discharge machining electrode is formed by cutting, and FIG. 14b is an explanatory diagram showing the states of the essential components which are revealed after the electrode has been formed.

Figure 15A:
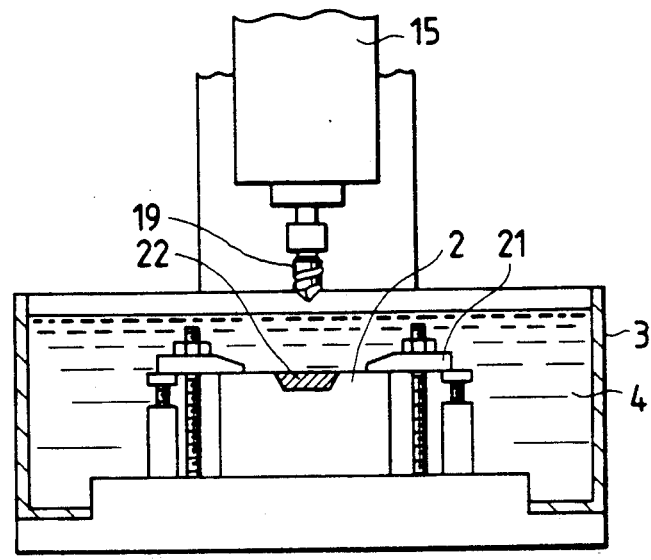
Figure 15B:
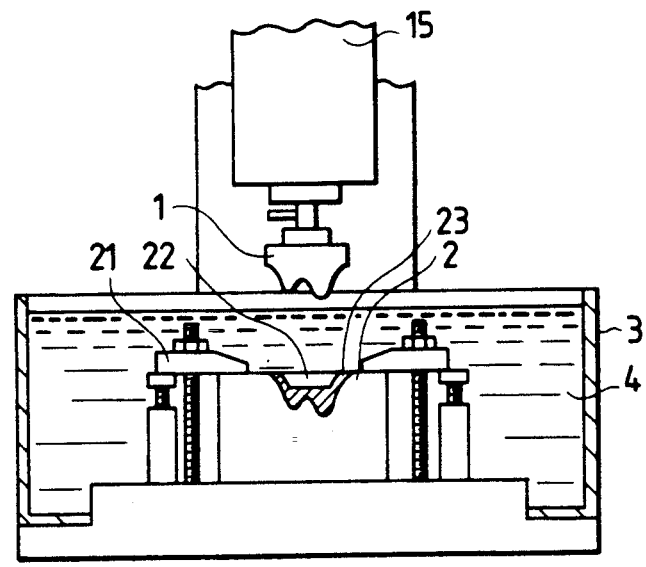

FIG. 15a is an explanatory diagram showing a step of cutting a workpiece in the apparatus shown in FIG. 13, and FIG. 15b is an explanatory diagram showing a step of machining the workpiece by electric discharge.

Figure 16:
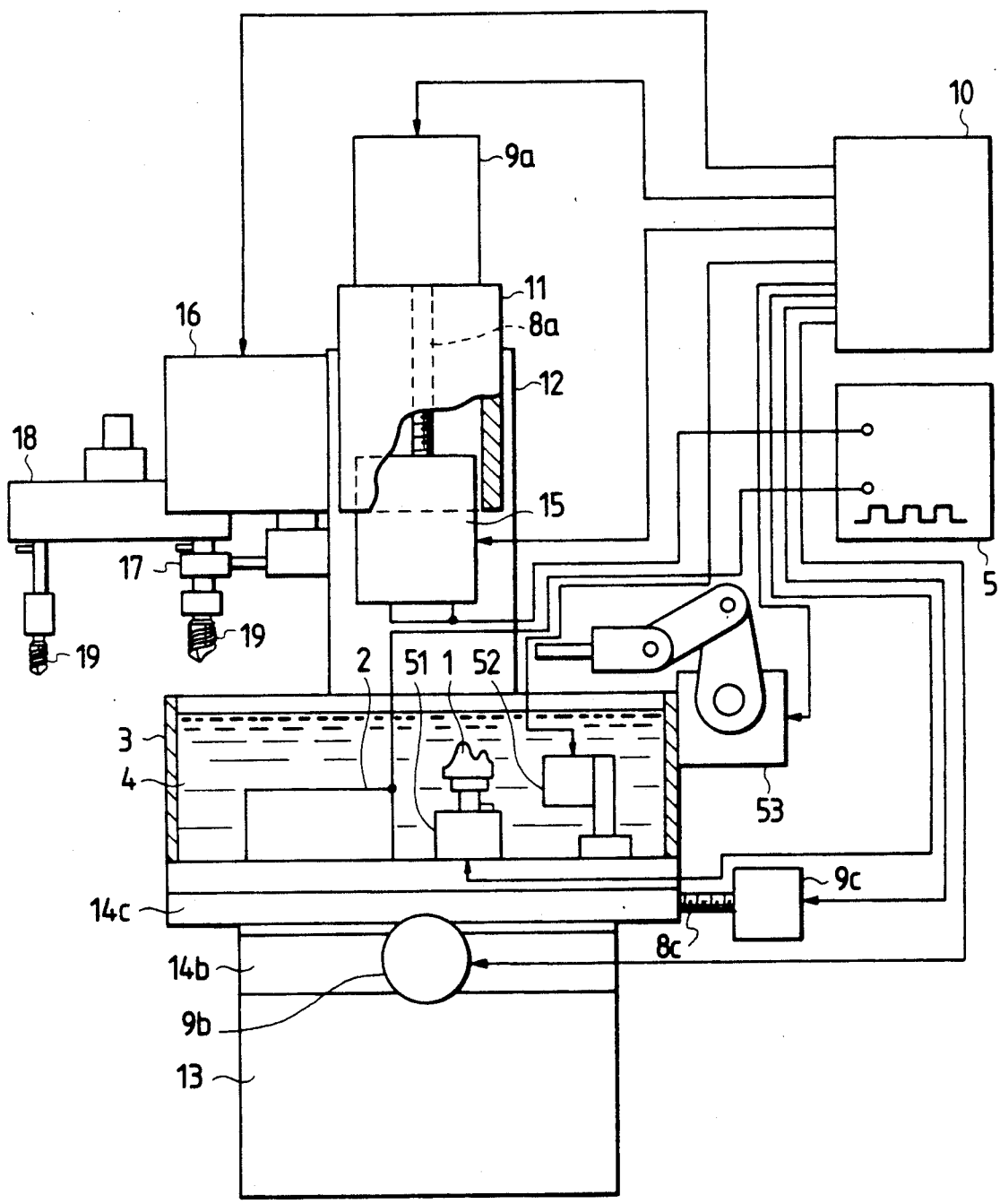

FIG. 16 is an explanatory diagram showing the entire arrangement of a compound machining apparatus, an embodiment of this invention.

FIGS. 17a to 18c are explanatory diagrams for a description of the machining operations of the apparatus shown in FIG. 16.

DETAILED DESCRIPTION OF THE INVENTION

Preferred embodiments of the present inventions will be described with reference to the accompanying drawings.

Figure 1:
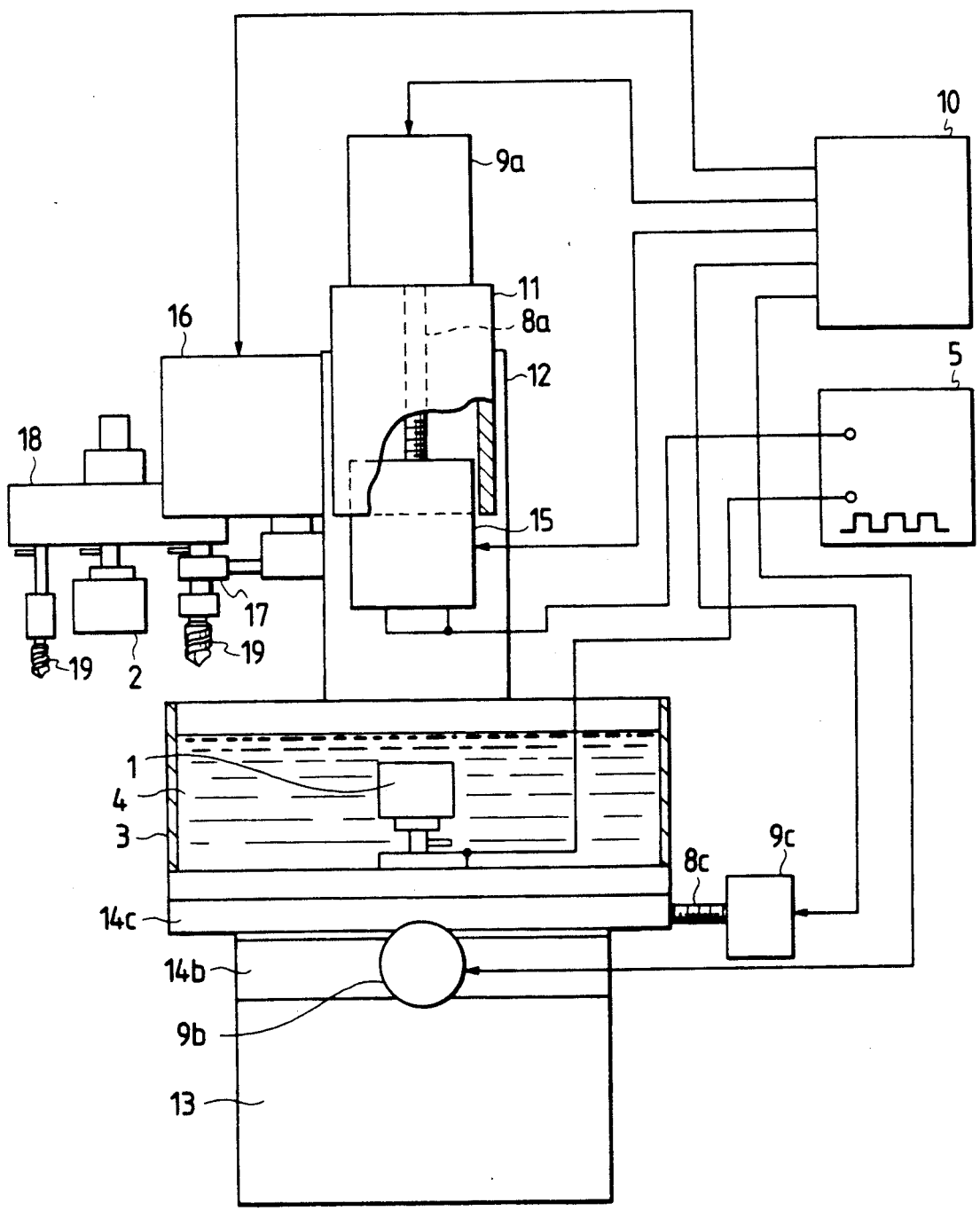
FIG. 1 is an explanatory diagram showing the entire arrangement of a compound machining apparatus, an embodiment of a first invention.
Figure 2:
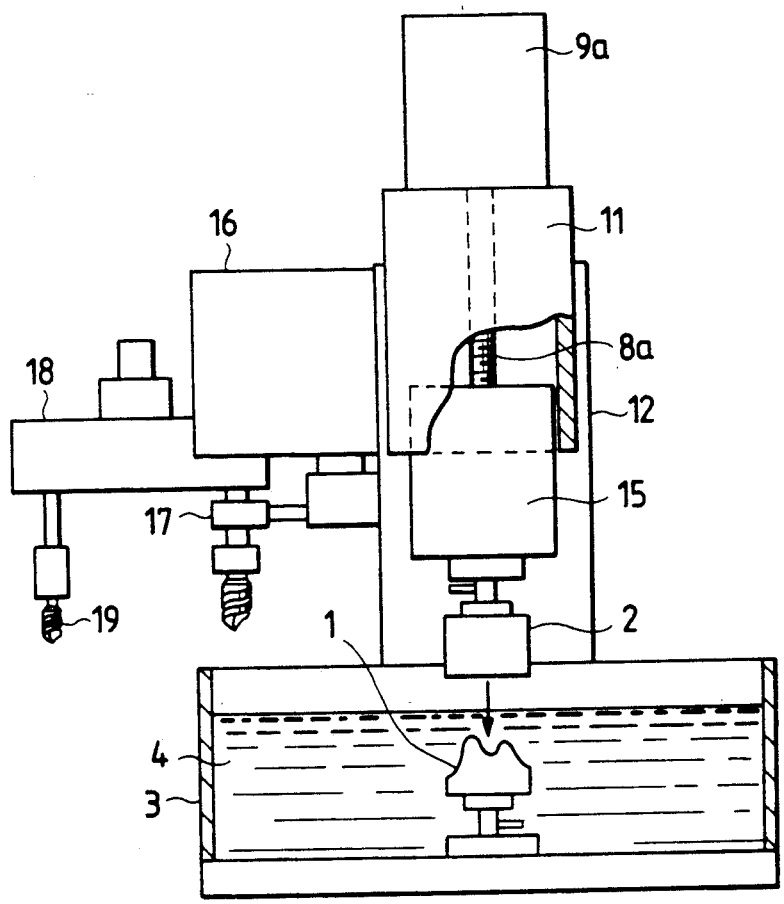
FIG. 2 is an explanatory diagram for a description of the electric discharge machining operation of the apparatus shown in FIG. 1.

First, a compound machining apparatus, an embodiment of a first invention, will be described with reference to FIGS. 1 and 2. FIG. 1 is an explanatory diagram showing the entire arrangement of the compound machining apparatus, and FIG. 2 is also an explanatory diagram showing essential components of the apparatus illustrated in FIG. 1, for a description of its electric discharge machining operation. In those figures, reference numerals 1 through 5 and 8a through 19 are functionally equivalent to those which have been designated in FIGS. 13 through 15. In the apparatus of the invention, a workpiece 1 to be machined has been accommodated in the magazine rack 18.

The compound machining apparatus thus constructed operates as follows:

First, an operation of forming an electric discharge machining electrode will be described.

An electrode material to be formed into an electrode 1 having a predetermined configuration is fixedly secured on the movable table 14c and is then kept immersed in the machining solution 4 in the machining vessel 3. With the arm 17 of the electrode exchanging unit 16, a cutting tool 19 for cutting the electrode material into the electrode 1 is taken out of the magazine rack 18 and connected to the spindle head 15 of the spindle. Under this condition, the cutting tool 19 is rotated, and the servo motors 9a, 9b and 9c are suitably driven by the numerical control unit 10, so that the aimed electrode is formed. In the embodiment, means for forming an electric discharge machining electrode is as described above.

After the formation of the aimed electrode 1, the cutting tool 19 is remove from the spindle head 15 and returned to the magazine rack 18 with the ar 17 of the electrode exchanging unit 16. Thereafter, the arm 17 of the electrode exchanging unit 16 is operated again to take the workpiece 2 out of the magazine rack 18 and to connect it to the spindle head 15. In the embodiment, means for exchanging parts which are connected to the spindle head (hereinafter referred to as "parts exchanging means", when applicable) is constructed as described above.

Now, an operation of machining the workpiece by electric discharge will be described with reference to FIG. 2.

The workpiece 2 secured to the spindle head 15 by the parts exchanging means is moved downwardly; that is, it is moved towards the electrode 1 which has been secured inside the machining vessel 3 in such a manner that it is immersed in the machining solution 4 in the machining vessel 3. After the workpiece 2 has been set close to the electrode 1, the pulse current generating unit 5 applies pulse current to the electrode 1 and the workpiece 2, to machine the latter 2. In the embodiment, means for machining a workpiece by electric discharge is as described above.

The above-described embodiment may be applied to a compound machining method, an embodiment of a sixth invention, which comprises a first step of cutting an electrode material secured in such a manner that the electrode material is immersed in the machining solution 4 into an aimed electrode having a predetermined configuration using a cutting tool 19 connected to the spindle, a step of exchanging the cutting tool 19 connected to the spindle for a workpiece 2 to be machined after the first step has been achieved, and a third step of machining the workpiece in the machining solution 4 using the electrode 1 by electric discharge.

In the embodiment of each of the above-described inventions, the electrode material fixedly immersed in the machining solution 4 is cut into the aimed electrode 1 with the cutting tool 19 connected to the spindle, and thereafter the parts exchanging means is operated to exchange the cutting tool 19 for the workpiece 2 to be machined, and under this condition the workpiece 2 is machined with the electrode 1 in the machining solution 4 by electric discharge.

Thus, the step of forming the aimed electrode 1, and the step of machining the workpiece 2 by electric discharge can be automatically continuously carried out. This will eliminate the difficulty of the related art that, after the formation of the aimed electrode 1, it is necessary for the operator to perform various preliminary operations before starting machining the workpiece 2. As a result, the above-described steps are readily shifted from one to another, and all the steps from the electrode forming step to the workpiece machining step can be achieved in a short period of time.

In the embodiment, the aimed electrode 1 is formed while being kept immersed in the machining solution 4, and the workpiece is machined with the electrode. As a result, the positioning work can be achieved with ease, and the machining accuracy is increased: that is, the workpiece can be machined with high accuracy.

Now, a compound machining apparatus according to a second invention will be described.

Figure 3:
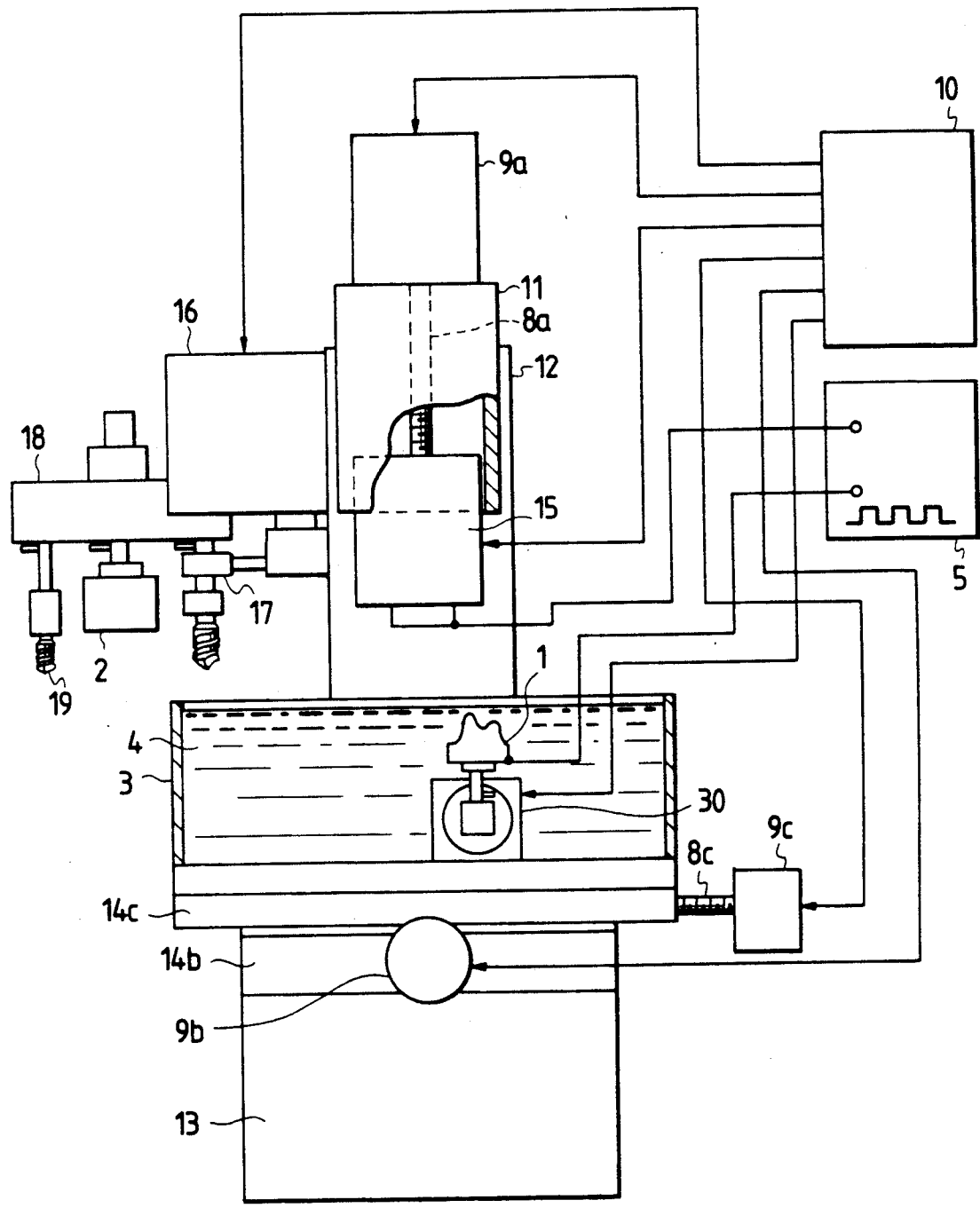
FIG. 3 is an explanatory diagram showing the entire arrangement of a compound machining apparatus, an embodiment of a second invention.
Figure 4A:
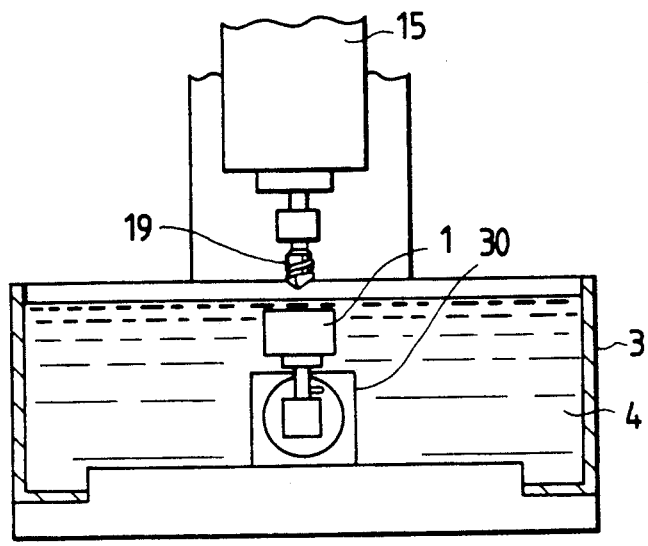
FIGS. 4a and 4b are explanatory diagrams showing the states of essential components of the apparatus in FIG. 3 which are revealed before an electrode forming operation is started.
Figure 4B:
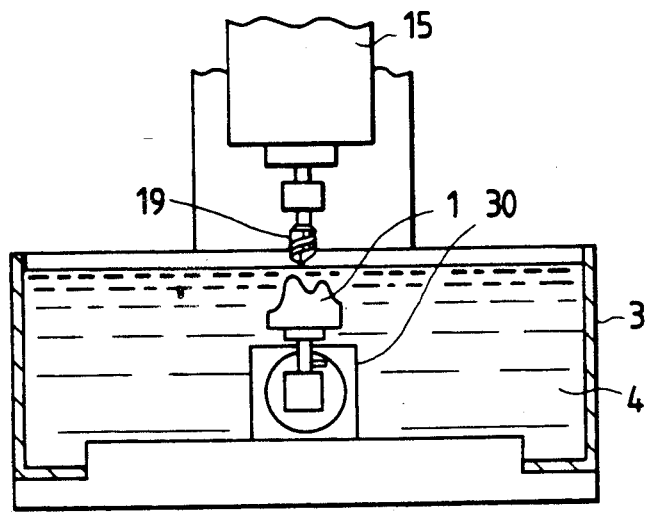

FIG. 3 is an explanatory diagram showing the entire arrangement of the compound machining apparatus, an embodiment of the second invention. FIG. 4a is an explanatory diagram showing the states of essential components of the apparatus which are revealed before an electrode is formed; and FIG. 4b is also an explanatory diagram showing the states of the essential components after the electrode has been formed. In these figures, reference numerals 1 through 5 and 8a through 19 designate the components which are the same as or equivalent to those in the above-described apparatus proposed by applicant or in the embodiment of the above-described first invention.

In FIGS. 3 and 4, reference numeral 30 designates an electrode fixing angle changing unit for changing an electrode fixing angle freely. With the electrode fixing angle changing unit 30, the electrode 1 is fixedly immersed in the machining solution 4. In the embodiment also, the workpiece 2 to be machined has been accommodated in the magazine rack 18 in advance.

The operation of the compound machining apparatus thus constructed will be described.

First, a step of forming an electric discharge machining electrode 1 will be described.

An electrode material is fixedly secured on the movable table 14c using the electrode fixing angle changing unit 30 in such a manner that it is immersed in the machining solution 4 in the machining vessel 3. With the arm 17 of the electrode exchanging unit, a cutting tool 19 suitable for forming the electrode is taken out of the magazine rack 18, and connected to the spindle head 15 (as shown in FIG. 4b). Under this condition, the cutting tool 19 is driven, while the servo motors 9a, 9b and 9c are driven by the numerical control unit 10, so that the aimed electrode 1, which is shaped as required, is formed (as shown in FIG. 4b). In the embodiment, means for forming an electric discharge machining electrode is constructed as described above.

In the embodiment, means for exchanging parts which are connected to the spindle is the same as that which has been described with reference to the embodiment of the first invention.

Figure 5:
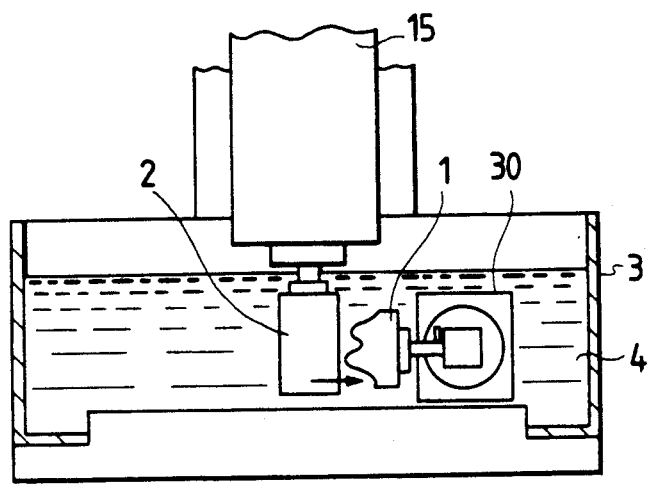
FIG. 5 is an explanatory diagram showing the states of the essential components of the apparatus in FIG. 3 which are revealed before a workpiece is machined by electric discharge.

A step of machining the workpiece 2 by electric discharge will be described with reference to FIG. 5.

Before an electric discharge machining operation is started, the electrode fixing angle changing unit 30 is operated to change the fixing angle of the electrode 1. In the case of FIG. 5, the fixing angle is changed in such a manner that the electrode is turned 90°. Under this condition, the part exchanging means is so operated that the workpiece 2 secured to the spindle head is moved towards the electrode thus fixed, thus being machined with the electrode 1 by electric discharge. In the embodiment, means for machining the workpiece with the electrode 1 by electric discharge is designed as described above.

In the above-described embodiment of the second invention, the electrode machining means is operated; that is, the electrode material fixedly immersed in the machining solution 4 with the electrode fixing angle changing unit 30 capable of changing the electrode fixing angle freely is cut with the cutting tool 19 into the aimed electrode which is shaped as required; and then the parts exchanging means is operated to exchange the cutting tool 19 for the workpiece 2; and thereafter the workpiece machining means is operated to machine the workpiece 2 with the electrode 1 in the machining solution 4.

Accordingly, in the embodiment also, similarly as in the embodiment of the first invention, the step of forming the electric discharge machining electrode 1, and the step of machining the workpiece 2 by electric discharge can be automatically continuously carried out. Thus, the above-described steps are readily shifted from one to another with ease, and all the steps from the electrode forming step and the workpiece machining step can be achieved in a short period of time.

In the embodiment, the electrode forming operation and the workpiece machining operation can be performed with the electrode fixing angle set to a desired value, with a result that the degree of freedom in machining workpieces is increased; that is, workpieces can be machined in a wide range. Furthermore, in the embodiment, the electrode is turned 90° after being cut from above. As a result, chips formed by cutting are caused to drop; that is, the electrode 1 is automatically cleaned. In addition, since the workpiece 2 is machined laterally by electric discharge, the waste material or chips formed are allowed to drop, too. That is, in the embodiment, the waste material or chips formed can be removed efficiently. Furthermore, the machining gas produced during machining can be eliminated efficiently. Thus, the electric discharge machining operation can be carried out with high stability and with high efficiency.

The above-described compound machining apparatus has the electrode fixing angle changing unit 30 with the turn table; however, it should be noted that the invention is not limited thereto or thereby. That is, the electrode fixing angle changing unit 30 may be modified as shown in FIG. 6. FIG. 6a is a front view of the electrode fixing angle changing unit which can be applied to the embodiment of the second invention; and FIG. 6b is a side view thereof.

In FIG. 6, reference numeral 40 designates a base for the electrode fixing angle changing unit 30; 41, a movable lever; and 42, a rotary shaft. The movable lever 41 is mounted on the base 40 in such a manner that it is swingable about the rotary shaft 42.

In the case of the electrode fixing angle changing unit 30, the electrode 1 is connected to the end of the movable lever 41, so that the electrode 1 can be fixedly secured in the machining solution 4 in the machining vessel 3 with its fixing angle set to a desired value.

A compound machining apparatus according to a third invention will be described.

FIG. 7 is an explanatory diagram showing the entire arrangement of the compound machining apparatus, an embodiment of the third invention. FIG. 8a to 8c are also explanatory diagrams for a description of the operation of the compound machining apparatus shown in FIG. 7. In these figures, reference numerals 1 through 5 designate the components which are the same as or equivalent to those in the above-described apparatus proposed by applicant and in the above-described embodiments of the first and second invention.

In FIGS. 7 and 8, reference numeral 31 designates an electrode detachably-connecting hand built in the turn table of the electrode fixing angle changing unit 30. The hand 31 is used to detachably connect the electrode 1 to the electrode fixing angle changing unit 30. In this case, the workpiece 2 has been fixedly mounted on the movable table 14c in such a manner that it is immersed in the machining solution 4 in the machining vessel 3.

The operation of the compound machining apparatus thus constructed will be described.

The electrode machining means of the embodiment is the same as that of the embodiment of the above-described second invention. Accordingly, in the embodiment, the operation of forming the electrode 1 is substantially equal to that in the embodiment of the second invention. Therefore, here will be described only the operation carried out after the electrode forming operation.

After the electrode 1 has been formed, the arm of the electrode exchanging unit 16 is operated to remove the cutting tool 19 from the spindle head 15 and to return it to the magazine rack 18. Thereafter, the electrode 1 thus formed is turned 180° by the turn table of the electrode fixing angle changing unit 30 (cf. FIG. 8a). Under this condition, the spindle head 15 is moved downwardly, so that the shank of the electrode 1 thus set upside down is secured to the spindle head 15; that is, the electrode 1 is fixedly connected to the spindle. After the electrode 1 has been connected to the spindle, the electrode detachably-connecting hand 31 of the electrode fixing angle changing unit 30 is opened (as shown in FIG. 8b). In the embodiment, its parts exchanging means for exchanging the cutting tool 19 for the electrode 1 is constructed as described above.

Under this condition, the electrode 1 is set above the workpiece 2, and is then moved towards the latter 2 which is fixedly immersed in the machining solution 4 in the machining vessel 3. The electrode 1 is set close to the workpiece 2 to machine the latter by electric discharge. In the embodiment, its workpiece machining means for machining a workpiece 2 with an electrode 1 by electric discharge is designed as described above.

As was described above, in the embodiment of the third invention, first the electrode forming means is operated so that the electrode material, which is fixedly immersed in the machining solution by the electrode fixing angle changing unit 30 capable of changing the fixing angle freely, is machined into an aimed electrode having a predetermined configuration with the cutting tool 19 connected to the spindle; and then the parts exchanging means is operated to exchange the cutting tool 19 connected to the spindle for the electrode 1 which has been turned 180° in fixing angle; and thereafter the workpiece machining means is operated to machine the workpiece with the electrode 1 in the machining solution by electric discharge.

Hence, in the above-described embodiment, similarly as in the embodiments of the first and second inventions, the step of forming an electric discharge machining electrode, and the step of machining a workpiece with the electrode can be automatically successively carried out. Hence, the above-described steps are readily shifted from one to another, and all the steps from the electrode forming step and the workpiece machining step are achieved in a short period of time.

Furthermore, in the embodiment, the electrode forming operation and the workpiece machining operation can be performed with the workpiece 2 held immersed in the machining solution 4 in the machining vessel 3. Therefore, the third invention is effective in machining a relatively large workpiece 3 by electric discharge. Furthermore, since the electrode 2 is formed by cutting the electrode material from above, and is then turned upside down, the waste material or chips formed during cutting are allowed to drop; that is, they can be positively removed. Thus, in the embodiment of the third invention, similarly as in that of the second invention, the electric discharge machining operation is high both in stability and in efficiency.

The above-described embodiment may employ the electrode fixing angle changing unit 30 with the movable lever 41 as shown in FIG. 6. In this case, it is necessary to modify the unit 30 so that the movable lever 41 is able to be turned 180°.

Now a compound machining apparatus according to a fourth invention will be described with reference to FIGS. 16, 17a to 17c and 18a to 18c.

FIG. 16 is an explanatory diagram showing the entire arrangement of a compound machining apparatus, which is the embodiment of the fourth invention. FIGS. 17a to 18c are explanatory diagrams for a description of an electric discharge machining operation carried out with the compound machining apparatus shown in FIG. 16. In these figures, reference numerals 1 through 5 and 8a through 19 designates the components which are the same as those in the above-described compound machining apparatus.

In the figures, reference numeral 51 designates electrode holding means fixedly mounted on the movable table 14c in such a manner that it is extended to confront with the spindle; 52, electrode holding means which is secured in such a manner that it is extended perpendicular to the spindle; and 53, electrode engaging and disengaging means for moving the electrode 1 between the electrode holding means 51 and 52, and between the spindle head 15, which is a part of the spindle, and the electrode holding means 51 and 52 to connect the electrode thereto or disconnect it therefrom.

The compound machining apparatus thus constructed operates as follows:

First, a step of forming the electric discharge machining electrode 1 by cutting will be described.

Figure 17A:
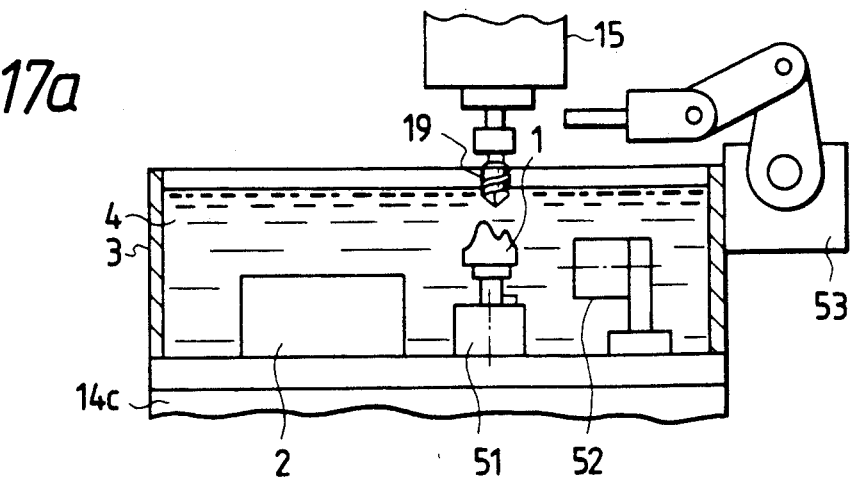
Figure 17B:
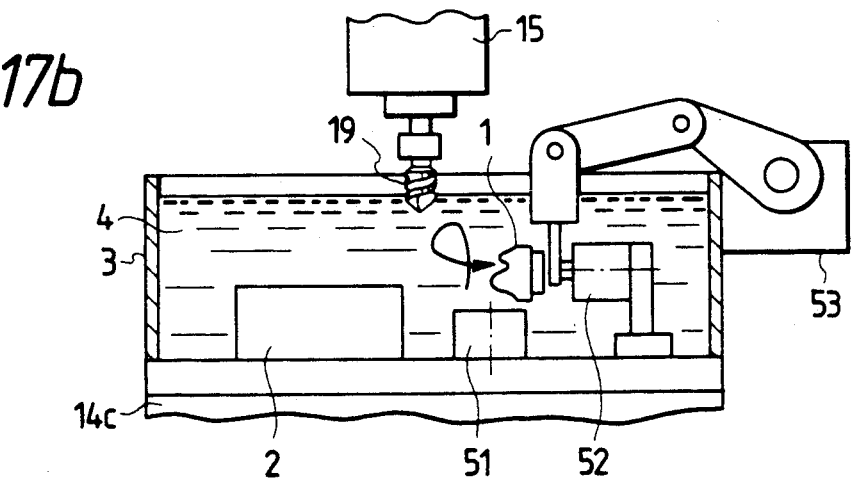
Figure 17C:
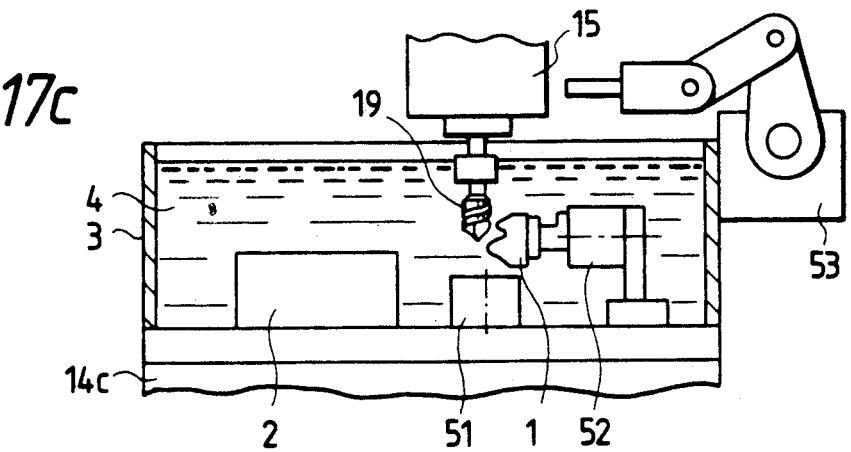
Figure 18A:
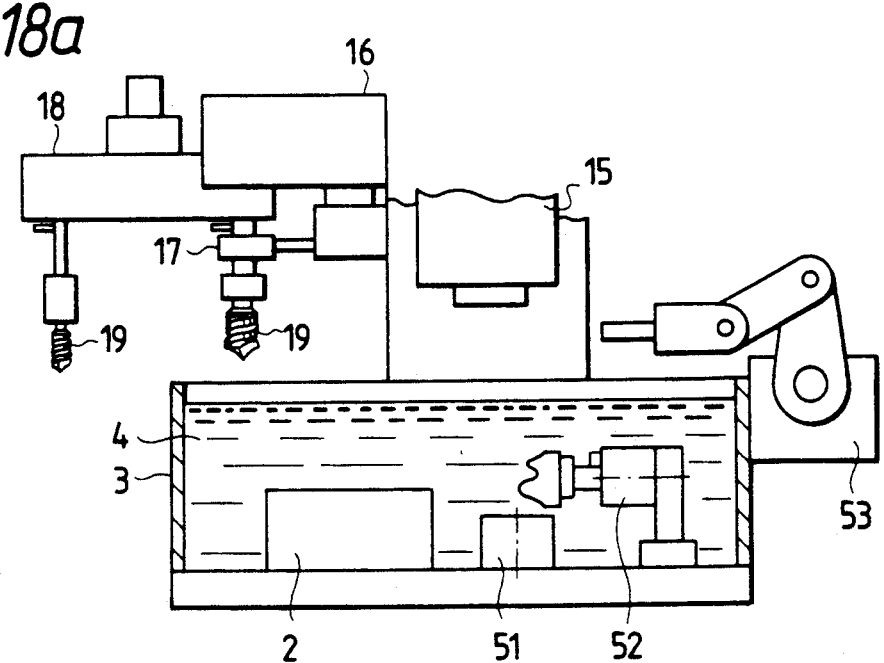
Figure 18B:
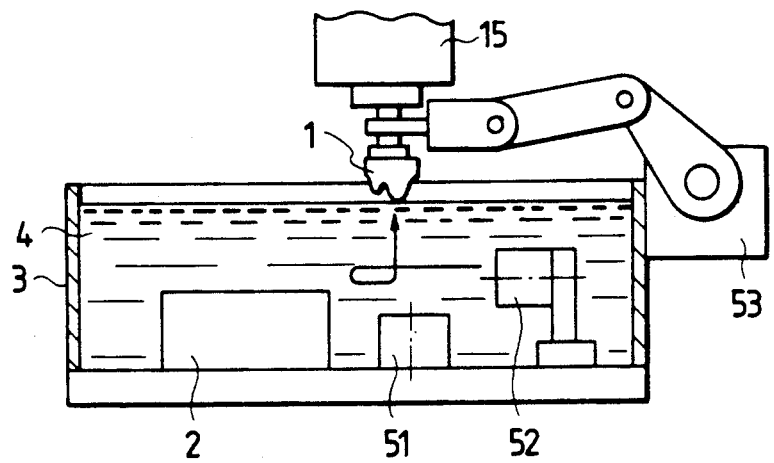
Figure 18C:
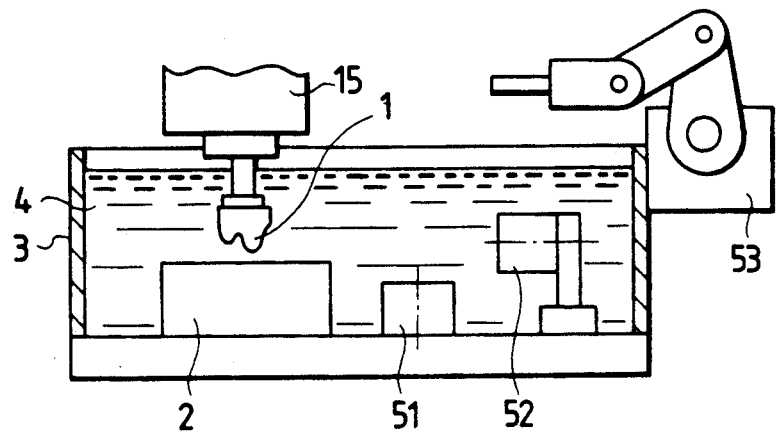

The electrode material is fixedly mounted on the movable table 14c through the electrode holding means 51 in such a manner that the electrode material is held in the machining solution 4 in the machining vessel 3. A cutting tool 19 for forming the electrode 1 is taken out of the magazine rack 18 and is connected to the spindle head 15 by using the arm 17 of the electrode exchanging unit 16. The cutting tool 19 is driven, while the servo motors 9a, 9b and 9c are operated by the numerical control unit 10, so that the electrode surface confronted with the spindle is cut with the cutting tool (as shown in FIG. 17a). Thereafter, in order to machine the side of the electrode thus cut, the electrode engaging and disengaging means 53 is operated to remove the electrode 1 from the electrode holding means 51 and to connect the electrode thus removed to the electrode holding means 52, so that the direction of the electrode is changed (as shown in FIG. 17b). Under this condition, the electrode is machined with the cutting tool 19 (as shown in FIG. 17c). In the embodiment, electrode forming means for forming an electric discharge machining electrode by cutting is designed as described above.

Now, a step of machining the workpiece 2 by electric discharge will be described with reference to FIG. 16. After the formation of the electrode 1, the electric discharge machining operation is started. For this purpose, the arm 17 of the electrode exchanging unit 16 is operated to return the cutting tool 19 from the spindle head 15 to the magazine rack 18, and the electrode engaging and disengaging means 53 is operated to move the electrode from the electrode holding means 52 to the spindle head 15 and to chuck it to the latter 15. Thereafter, the electrode 1 is set close to the workpiece 2 to machine the latter by electric discharge. In the embodiment, workpiece machining means for machining a workpiece with the electrode 1 by electric discharge is designed as described above.

In the embodiment, the electrode forming operation and the workpiece machining operation can be carried out with the electrode fixing angle changed to a desired value, as result of which the degree of machining freedom; that is, the machining range is increased as much. When, after being machined from above, the electrode is turned over, the chips formed during the cutting operation are allowed to drop; that is, the electrode is cleaned.

In the above-described embodiment, two electrode holding means 51 and 52 are arranged in such a manner that they are perpendicular to each other; however, the invention is not limited thereto or thereby. That is, more than two electrode holding means may be arranged, and they may form an angle other than right angles therebetween.

In the above-described embodiment, immediately after the electric discharge machining electrode is formed, the electric discharge machining of the workpiece is started. However, similarly as in the compound machining apparatus proposed by applicant, a step of machining the workpiece coarsely with a cutting tool may be inserted before the workpiece is actually machined by electric discharge. In this case, the numerical control unit 10 is operated to change the machining program thereby to change the order of the machining steps.

Now, a compound machining apparatus according to a fifth invention will be described with reference to FIGS. 9 to 12.

FIG. 9 is an explanatory diagram showing the entire arrangement of the compound machining apparatus, an embodiment of the fifth invention. FIG. 10a to 10c, FIGS. 11a to 11c, and FIG. 12a to 12c are explanatory diagrams showing essential components of the compound machining apparatus for a description of the operation of the latter. In these figures, reference numerals 1 through 5, 8a through 19 and 30 designate the components which are the same as or equivalent to those in the above-described embodiments of the first, second, third and fourth inventions.

In the figures, reference numeral 51 designates an electrode holder fixedly mounted on the movable table 14c in such a manner that it is extended in the direction of movement of the spindle; and 52, an electrode holder secured in such a manner that it is perpendicular to the direction of movement of the spindle. Further in the figures, reference numeral 53 designates a electrode conveying robot for moving the electrode 1 between the two electrode holders 51 and 52, between the electrode holder 51 and the spindle head 15, and between the electrode holder 52 and the spindle head 15; and 61, dummy electrodes which can be detachably connected to the electrode connecting parts of the electrode holders 51 and 52. In the embodiment, the electrode conveying robot 53 functions as first, second and third electrode moving means. The first electrode moving means is to move the electrode between the electrode holders 51 and 52 and fixedly hold it therebetween. The second electrode moving means is to move the dummy electrode 61 to the electrode holder 51 or 52 to the electrode connecting part of which the electrode 1 is not connected, and to connect it thereto. The third electrode moving means is to move the electrode 1 or the dummy electrode 61 between the electrode holder 51 or 52 and the spindle and to connect it thereto.

The above-described embodiment of the fifth invention has the same parts exchanging means as that of the first invention. Furthermore, it has the workpiece machining means for machining the workpiece with the electric discharge machining electrode 1 in the machining solution 4 by electric discharge which has been formed and connected to the spindle. The exchanging of the cutting tool 19 connected to the spindle, the exchanging of the dummy electrode 61, and the exchanging of the electrode 1 are carried out when necessary.

The operation of the compound machining apparatus thus constructed will be described with reference to FIGS. 10, 11 and 12.

First, a step of forming the electric discharge machining electrode 1 will be described with reference to FIGS. 10 and 11.

Figure 10A:
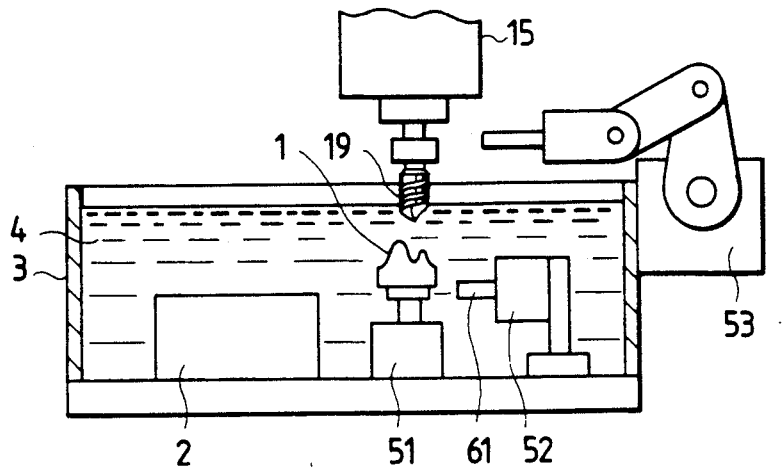
Figure 10B:
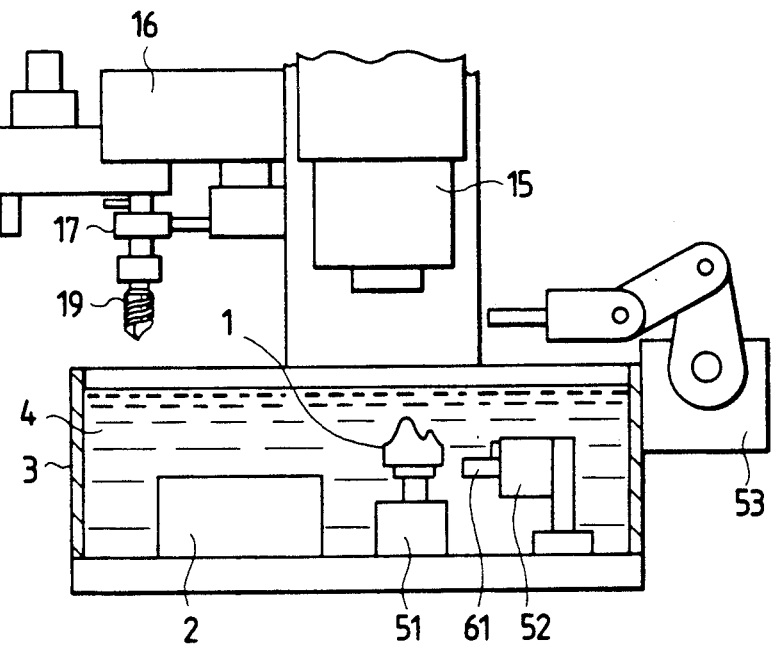
Figure 10C:
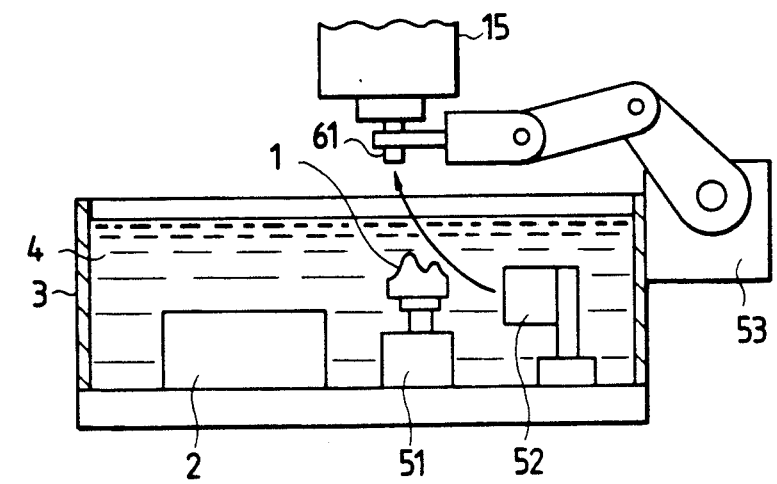
Figure 11A:
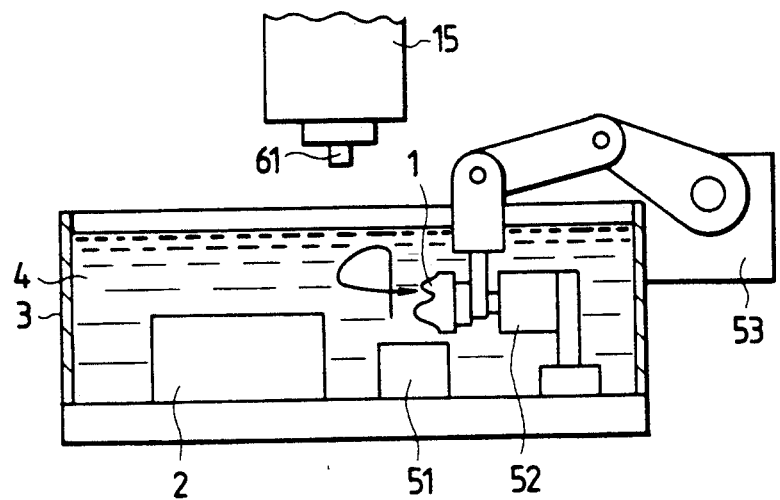
Figure 11B:
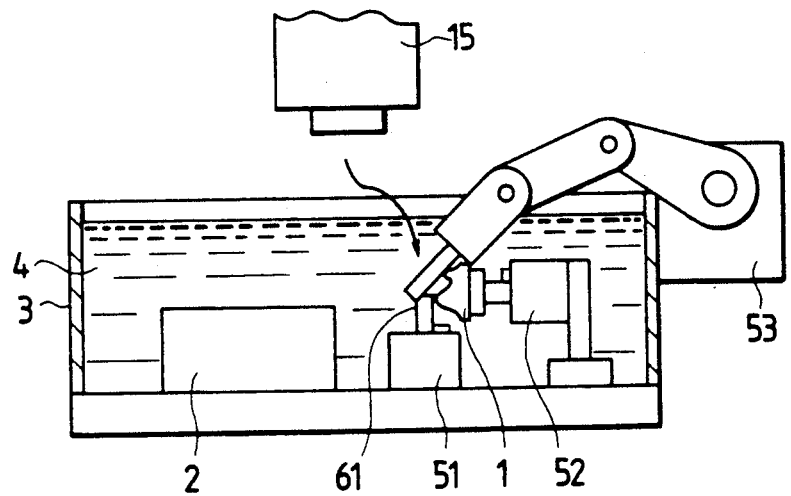
Figure 11C:
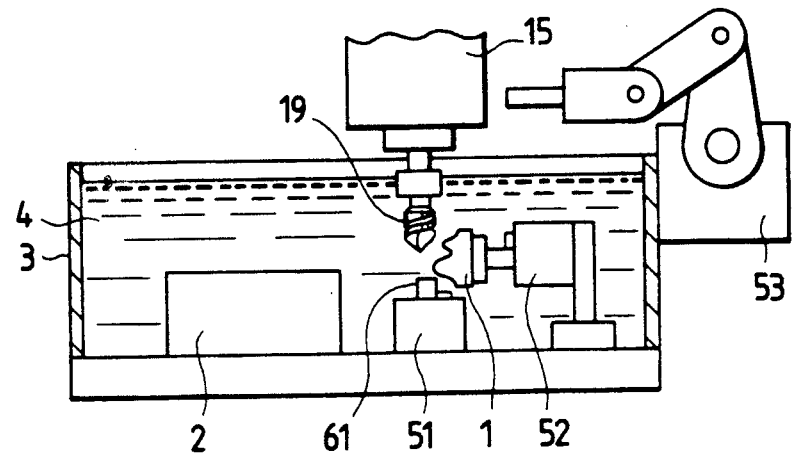

An electrode material is fixedly held on the movable table 14c with the electrode holder 51 which is extended in the direction of movement of the spindle, in such a manner that the electrode material is immersed in the machining solution 4 in the machining vessel 3. Under this condition, the dummy electrode is connected to the electrode connecting part of the other electrode holder 52 so that, when the electrode material is cut, waste material or chips formed may not go thereinto. Under this condition, the arm of the electrode exchanging unit 16 (serving as the part exchanging means) is operated to take out of the magazine rack 18 the cutting tool 19 which is suitable for cutting the electrode material secured to the electrode holder 51, and to connect it to the spindle head. Thus, the preliminary operation for the cutting operation has been accomplished. Under this condition, the cutting tool 19 is driven, while the servo motors 9a, 9b and 9c are suitably driven by the numerical control unit 10, so that the electrode surface confronted with the spindle is machined (as shown in FIG. 10a). In this operation, the chips formed may scatter to the other electrode 51; however, they will not go into the important reference part of the latter because the electrode connecting part has been covered with the dummy electrode 61. The above-described step is shifted to a step of machining the side of the electrode 1 as follows:

First, the cutting tool 19 is removed from the spindle head 15 and returned to the magazine rack 18 (cf. FIG. 10b). Then, the dummy electrode 61 is disconnected from the electrode holder 52 and then connected to the spindle head 15 (cf. FIG. 10c). Thereafter, the electrode 1 is disconnected from the electrode holder 51 and then fixedly connected to the other electrode holder 52 with the fixing angle changed (as shown in FIG. 11a). Under this condition, the dummy electrode 61 is disconnected from the spindle head 15, and then fixedly connected to the electrode connecting part of the electrode holder 51 (as shown in FIG. 11b). The moving, connecting and disconnecting of the electrode 1 and the dummy electrode 61 are carried out by the electrode conveying robot 53.

The electrode conveying robot 53, as was described above, functions as the first electrode moving means for moving the electrode 1 to the electrode holder 51 and 52 different in fixing angle and fixedly connecting it thereto separately according to the machining steps, as the second electrode moving means for moving the dummy electrode to the electrode holder 51 or 52 to which the electrode 1 is not connected, and as the third electrode moving means for moving the electrode 1 and the dummy electrode 61 between the electrode holders 51 and 52 and the spindle.

Thus, the preliminary operation for the operation of cutting the side of the electrode has been accomplished.

Under this condition, the cutting tool 19 is driven, while the servo motors 9a, 9b and 9c are suitably operated by the numerical control unit 10, so that the electrode surface confronting the spindle is machined (cf. FIG. 11b). In this operation, the chips formed may scatter to the other electrode 51; however, they will not go into the important reference part of the latter because the electrode connecting part has been covered with the dummy electrode 61.

Now, a step of machining the workpiece by electric discharge will be described with reference to FIG. 12.

Figure 12A:
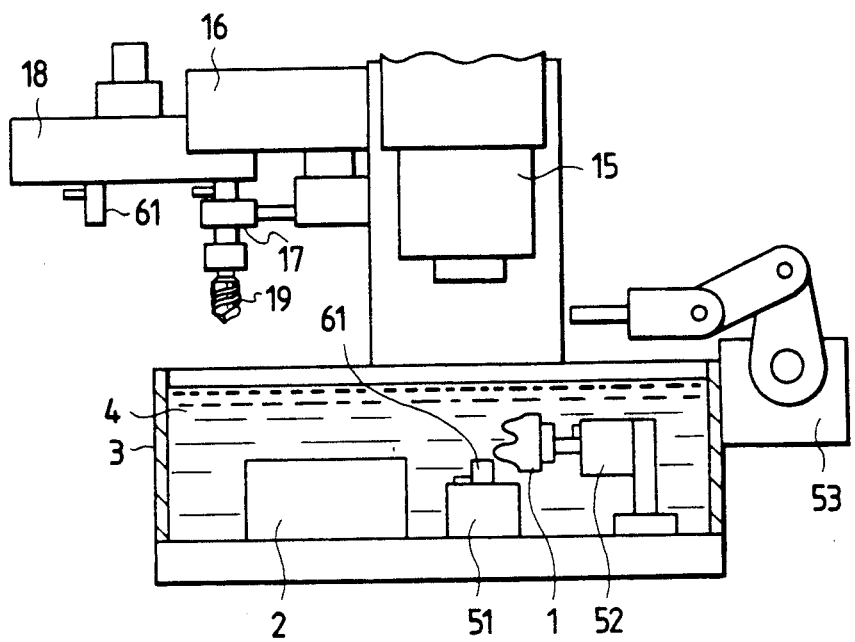
Figure 12B:
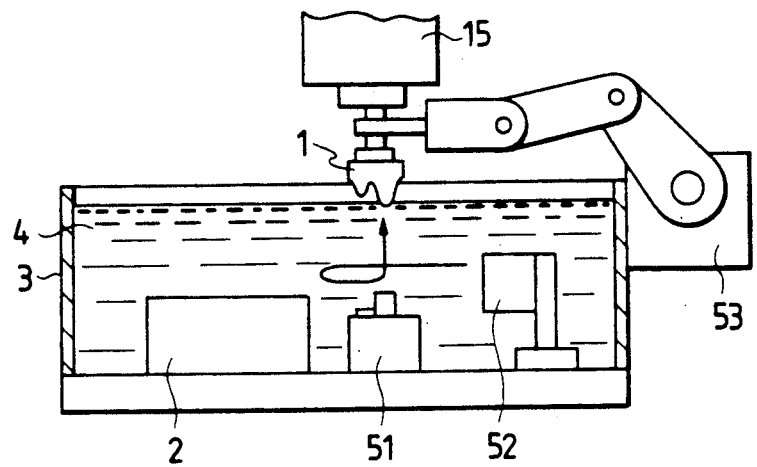
Figure 12C:
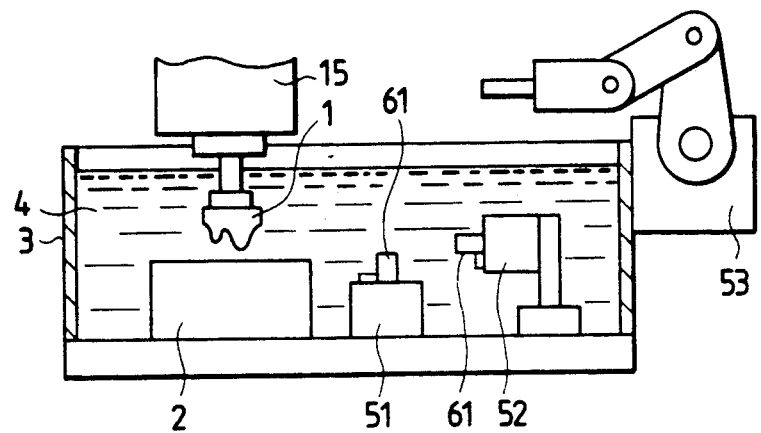

When the electrode 1 has been formed as described above, the cutting tool 19 is returned from the spindle head 15 to the magazine rack 18 by the arm 17 of the electrode exchanging unit 16 which is the part exchanging means (cf. FIG. 12a). The electrode 1 thus formed is removed from the electrode holder 51 and connected to the spindle head 15 (cf. FIG. 12b). The moving, connecting and disconnecting of the electrode 1 is carried out by the electrode conveying robot 53, which functions as the third electrode moving means for moving the electrode 1 between the electrode holders 51 and 51 and the spindle and connecting it thereto. Thereafter, the electrode 1 is returned from the spindle head 15 to the magazine rack 18 by the arm 17 of the electrode exchanging unit 16 serving as the part exchanging means (not illustrated). Under this condition, another dummy electrode 61 is taken out of the magazine rack 18 and connected to the spindle head 15 by the part exchanging means, and then it is connected to the electrode connecting part of the electrode holder 51 by the third electrode moving means of the electrode conveying robot 53. The electrode 1 is taken out of the magazine rack 18 and connected to the spindle head 15 again by the part exchanging means. Then, the electrode 1 and the spindle head 15 are moved to confront with the workpiece 1 (as shown in FIG. 12c). Thus, the preliminary operation for an operation of machining the workpiece by electric discharge has been accomplished. Under this condition, the pulse current generating unit 5 is operated to apply pulse current to machine the workpiece by electric discharge. In the embodiment its workpiece machining means for machining a workpiece with the electrode in the machining solution 4 by electric discharge which has been shaped as required is the same as those in the above-described embodiments of the first, second and third inventions. In this operation, the chips formed may scatter to the electrodes 51 and 52; however, they will not go into the important reference parts of the latter because the electrode connecting parts have been covered with the dummy electrodes 61.

In the above-described embodiment, similarly as in the embodiments of the first, second, third and fourth invention, the step of forming the electric discharge machining electrode 1 and the step of machining the workpiece 2 by electric discharge are automatically successively carried out. Therefore, the above-described steps are readily shifted from one to another, and all the steps from the electrode forming step to the workpiece machining step can be achieved in a short period of time.

With the compound machining apparatus described above, the electrode forming operation and the workpiece machining operation can be carried out with the workpiece fixedly held in the machining solution 4 in the machining vessel 3. Therefore, the use of the apparatus is effective in machining relatively large workpieces 2.

Furthermore, the electrode is formed by cutting the upper surface of the electrode material and then the side surface. Therefore, when the electrode is moved and turned over, the waste material or chips formed during the cutting operation are allowed to drop; that is, the electrode 1 can be readily cleaned.

In addition, in the embodiment, in cutting an electrode material into an electric discharge machining electrode having a predetermined configuration, the electrode material is connected to the electrode holders 51 and 52 which are different in electrode fixing direction; that is, the electrode material is held at different electrode fixing angles. Hence, the electrode material can be cut into an electrode having a desired configuration. When the electrode 1 is not connected to the electrode connecting parts of the electrode holders 51 and 52, the dummy electrodes 61 are connected to them. That is, in machining the workpiece with the electrode by electric discharge, the electrode connecting parts of the electrode holders 51 and 52 are covered with the dummy electrodes 61, and therefore the difficulty is prevented that the waste material or chips formed during the electric discharge machining operation stick to the electrode 1 and the electrode holders 51 and 52. Hence, the electrode 1 can be fixedly secured or connected with high accuracy, and accordingly in the machining operation, the reference position will not be shifted; that is, the electric discharge machining operation can be achieved with high accuracy.

In the above-described embodiment, the electrode holders 51 and 52 are arranged in two directions perpendicular to each other; however, the invention is not limited thereto or thereby. That is, the angle formed between the two directions may be other than right angles, and more than one electrode holder may be arranged in each of the directions. However, it is necessary that the number of dummy electrodes 61 is equal to that of electrode holders.

In the above-described embodiment, the dummy electrodes 61 are employed to prevent the difficulty that waste material such as chips and slag sticks to the electrode connecting parts of the electrode holders. The dummy electrodes 61 may be replaced by covers which can cover the electrode holders.

The compound machining apparatus, the embodiment of the fifth invention, performs: the step of cutting the electrode material fixedly immersed in the machining solution with the cutting tool 19 connected to the spindle into an electrode 1 having a predetermined configuration; the first through third electrode moving steps in which the electrode 1 is connected to the electrode holders 51 and 52 different in electrode fixing angle according to the machining steps, and the dummy electrodes 61 are connected to the electrode holes 51 and 52, and the electrode 1 and the dummy electrode 61 are moved between the electrode holders 51 and 52 and the spindle and connected thereto; and the step of exchanging, after the formation of the electrode, the cutting tool 19 connected to the spindle for the workpiece 2; and the step of machining the workpiece with the electrode in the machining solution 4 by electric discharge. Therefore, this may be regarded as a compound machining method concerning an embodiment of a seventh invention.

In the embodiment also, the slag formed may scatter to the electrode holders 51 and 52; however, it will not go into the important reference parts thereof because the electrode connecting parts thereof are covered with the dummy electrodes 61. Similarly as in the embodiments of the first through sixth inventions, the step of forming the electrode 1 and the step of machining the workpiece 2 by electric discharge are automatically successively carried out. Accordingly, the above-described steps are readily shifted from one to another, and all the steps from the electrode forming step to the workpiece machining step can be achieved in a short period of time.

In the above-described embodiments, immediately after the electric discharge machining electrode 1 is formed, the workpiece is machined by electric discharge. However, as was described with reference to the related art, the step of machining the workpiece roughly with the cutting tool 19 may be inserted before the workpiece 2 is actually machined by electric discharge. In this case, the numerical control unit 10 is operated to change the machining program thereby to change the order of the machining steps.

In the above-described embodiments, the cutting operation is described for the mechanical machining operation, and the electric discharge machining operation for the electrical machining operation. However, it goes without saying that the invention is not limited thereto or thereby, and various changes and modification can be made therein with the same effects without departing from the invention.

What is claimed is:

1. A compound machining apparatus adapted to machine a workpiece comprising:
   electrode forming means for mechanically machining an electrode material, fixedly secured in a machining solution, with a mechanical tool connected to a spindle into an electrode having a predetermined configuration;
   storage means for storing said mechanical tool and said workpiece;
   exchanging means for exchanging parts between said spindle and said storage means, wherein said exchanging means exchanges said mechanical tool connected to said spindle for said workpiece to be machined, said mechanical tool and said workpiece to be machined being moved relative to said electrode by said exchanging means; and
   workpiece machining means for electrically machining said workpiece with said electrode fixedly secured in said machining solution.

2. A compound machining apparatus as claimed in claim 1, wherein said storage means comprises a magazine rack, said workpiece being accommodated in said magazine rack.

3. A compound machining apparatus as claimed in claim 1 further comprising an electrode fixing angle changing unit for fixedly securing said electrode, said electrode fixing angle changing unit being capable of changing an electrode fixing angle freely.

4. A compound machining apparatus as claimed in claim 3, wherein said electrode fixing angle changing unit changes the electrode fixing angle by 180 degrees so that said electrode is connected to said spindle.

5. A compound machining apparatus as claimed in claim 1 further comprising:
   first electrode moving means for moving said electrode to a plurality of electrode holders in an electrode engagement direction and for connecting said electrode thereto;
   electrode holder covering means for covering said electrode holders, said electrode covering means comprising a dummy electrode;
   second electrode moving means for moving said dummy electrode to an electrode holder to which said electrode is not connected and for connecting said dummy electrode thereto; and
   third electrode moving means for moving said electrode and said dummy electrode between said electrode holders and said spindle and for connecting said electrodes thereto;
   wherein said exchanging means exchanges said mechanical tool, dummy electrode and said electrode connected to said spindle so that said workpiece is machined by said electrode connected to said spindle.

6. A compound machining apparatus as claimed in claim 1 further comprising:
   first electrode moving means for moving said electrode to a plurality of electrode holders different in an electrode engagement direction and for connecting said electrode thereto; and
   second electrode moving means for moving said electrode from said electrode holder to said spindle, and for connecting said electrode thereto.

7. A compound machining method comprising:
   a first step of cutting an electrode material, fixedly secured so that said electrode material is immersed in a machining solution, with a cutting tool connected to a spindle into an electrode having a predetermined configuration;
   a second step of exchanging, after said first step, said cutting tool connected to said spindle for a workpiece to be machined, said cutting tool and said workpiece being moved relative to said electrode; and
   a third step of machining, after said second step, said workpiece with said electrode fixedly secured in said machining solution by electric discharge.

8. A compound machining method comprising
   a step of cutting an electrode material, fixedly secured so that said electrode material is immersed in a machining solution, with a cutting tool connected to a spindle into an electrode having a predetermined configuration;
   a first electrode moving step of moving, separately according to machining steps, said electrode to a plurality of electrode holders in an electrode engagement direction and connecting said electrode to one of said plurality of said electrode holders;
   a step of providing electrode holder covering means for covering said electrode holders, said electrode covering means comprising a dummy electrode;
   a second electrode moving step of moving said dummy electrode to an electrode holder to which said electrode is not connected and connecting said dummy electrode thereto;

a third electrode moving step of moving said electrode and said dummy electrode between said electrode holders and said spindle, and connecting said electrode thereto;

a step of performing an exchanging of said cutting tool, dummy electrode, and electrode connected to said spindle;

a step of providing a workpiece fixedly secured in said machining solution;

a step of turning said electrode to have an orientation 180 degrees from that in which said electrode was machined; and a step of machining said workpiece fixedly secured in said machining solution by electric discharge with said electrode connected to said spindle.

* * * * *